US008224183B1

(12) United States Patent
Iannone et al.

(10) Patent No.: US 8,224,183 B1

(45) Date of Patent: Jul. 17, 2012

(54) METHOD AND APPARATUS FOR ENABLING MULTIPLE PASSIVE OPTICAL NETWORKS TO SHARE ONE OR MORE SOURCES

(75) Inventors: Patrick Paul Iannone, Red Bank, NJ (US); Han Hyub Lee, Daejeon (KR); Kenneth Charles Reichmann, Hamilton, NJ (US); Xiang Zhou, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1234 days.

(21) Appl. No.: 11/564,245

(22) Filed: Nov. 28, 2006

(51) Int. Cl.
*H04J 14/00* (2006.01)
*H04J 14/08* (2006.01)

(52) U.S. Cl. ................ 398/68; 398/66; 398/72; 398/98; 398/100

(58) Field of Classification Search .................... 398/60, 398/63, 66–73, 98–103
See application file for complete search history.

(56) References Cited

U.S. PATENT DOCUMENTS 7,446,933 B2 11/2008 Iannone et al.
2002/0118446 A1 8/2002 Lee et al.
2002/0135837 A1* 9/2002 Katayama .................... 359/124
2002/0191277 A1 12/2002 Chen et al.
2003/0090779 A1* 5/2003 Lee .............................. 359/334
2004/0067059 A1 4/2004 Song et al.
2004/0131358 A1* 7/2004 Jung et al. ....................... 398/72
2006/0275037 A1 12/2006 Evans et al.
2006/0275038 A1 12/2006 Walton et al.
2007/0092252 A1* 4/2007 Bouda et al. .................... 398/72
2008/0089692 A1* 4/2008 Sorin ........................... 398/135

OTHER PUBLICATIONS

Chen, Yihong, et al., "40 nm Broadband SOA-Raman Hybrid Amplifier", Mar. 17-22, 2002, Optical Fiber Communication Conference and Exhibit, 2002, OFC 2002, pp. 390-391.*

* cited by examiner

*Primary Examiner* — Kenneth N Vanderpuye
*Assistant Examiner* — Daniel Dobson

(57) ABSTRACT

A method and apparatus for implementing a hybrid SOA-Raman amplifier in a central office in order to enable multiple passive optical networks to share one or more enhancement service sources, e.g., to share a source for a broadcast service are disclosed.

20 Claims, 6 Drawing Sheets

300
280
325
324
323
322
321
320
1260-nm PUMP LASER
Isol
SOA
3 km Highly Nonlinear Fiber
1440-nm PUMP LASER
SOA
Isol
3 km
PUMP COUPLER
301
310
311
312
313
314
315
302

METHOD AND APPARATUS FOR ENABLING MULTIPLE PASSIVE OPTICAL NETWORKS TO SHARE ONE OR MORE SOURCES

The present application is related to US patent application entitled "METHOD AND APPARATUS FOR PROVIDING PASSIVE OPTICAL NETWORKS WITH EXTENDED REACH AND/OR SPLIT", having application Ser. No. 11/564,237 and US patent application entitled "METHOD AND APPARATUS FOR ENABLING MULTIPLE OPTICAL LINE TERMINATION DEVICES TO SHARE A FEEDER FIBER", having application Ser. No. 11/564,239, where both applications are herein incorporated by reference and both applications are simultaneously filed on the same date with the present application.

The present invention relates generally to communication networks and, more particularly, to a method and apparatus for enabling multiple passive optical networks to share one or more enhancement service sources.

BACKGROUND OF THE INVENTION

A passive optical network typically comprises an Optical Line Termination (OLT) located at a service provider site, a splitter located between the service provider site and the plurality of customer sites, and a plurality of Optical Network Terminations (ONT), e.g., 32 ONTs, for serving the customers. The passive optical network has limitations due to signal level requirements of the transceiver components in the OLT and ONTs. For example, a typical passive optical network may limit the distance between the OLT and the farthest ONT to be 20 km with an 1:32 split ratio due to the attenuation of the optical signals. However, as service providers expand their network, serving more and more customers with the same network and being able to extend the reach of the passive optical network become more and more important. Providing a passive optical network for every 32 customers does not allow service providers to reduce the cost of the network, i.e., there is minimal sharing of network resources. For example, an enhancement service source such as a video broadcast feed may have to be duplicated for every 32 customers.

Therefore, there is a need for a method and apparatus that enables multiple passive optical networks to share one or more sources for enhancement services.

SUMMARY OF THE INVENTION

In one embodiment, the present invention discloses a method and apparatus for implementing a hybrid SOA-Raman amplifier in a central office in order to enable multiple passive optical networks to share one or more sources for enhancement services, e.g., to share a source for a broadcast service. For example, the optical network comprises a plurality of enhancement service sources, where each of the plurality of enhancement service sources provides source information. The optical network further comprises a plurality of light sources, coupled to the plurality of enhancement service sources, where each of the light sources is for modulating the source information from one of the plurality of enhancement service sources to form a modulated optical signal. The optical network further comprises a wave division multiplexer (WDM) combiner, coupled to the plurality of light sources, for combining the modulated optical signals received from the plurality of light sources. The optical network further comprises at least one hybrid SOA-Raman amplifier, wherein the at least one hybrid SOA-Raman amplifier is coupled to the WDM combiner. Finally, the optical network further comprises at least one optical splitter, coupled to the at least one hybrid SOA-Raman amplifier, wherein the at least one optical splitter comprises a plurality of outputs.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing passive optical networks with extended reach and/or splitting ratio. Although the present invention is discussed below in the context of passive optical networks, the present invention is not so limited. Namely, the present invention can be applied to extend the reach of other fiber optic networks such as long haul and access networks.

The current invention discloses various passive optical networks that are based on the hybrid SOA-Raman amplifier. In one embodiment, the reach and/or splitting ratio of passive optical networks can be extended using a hybrid SOA-Raman amplifier. In another embodiment, multiple passive optical networks may share a feeder fiber by using the optical gain of a hybrid SOA-Raman amplifier. In yet another embodiment, multiple passive optical networks are enabled to share source signals for enhancement services via a hybrid SOA-Raman amplifier deployed at a central office.

Figure 1:
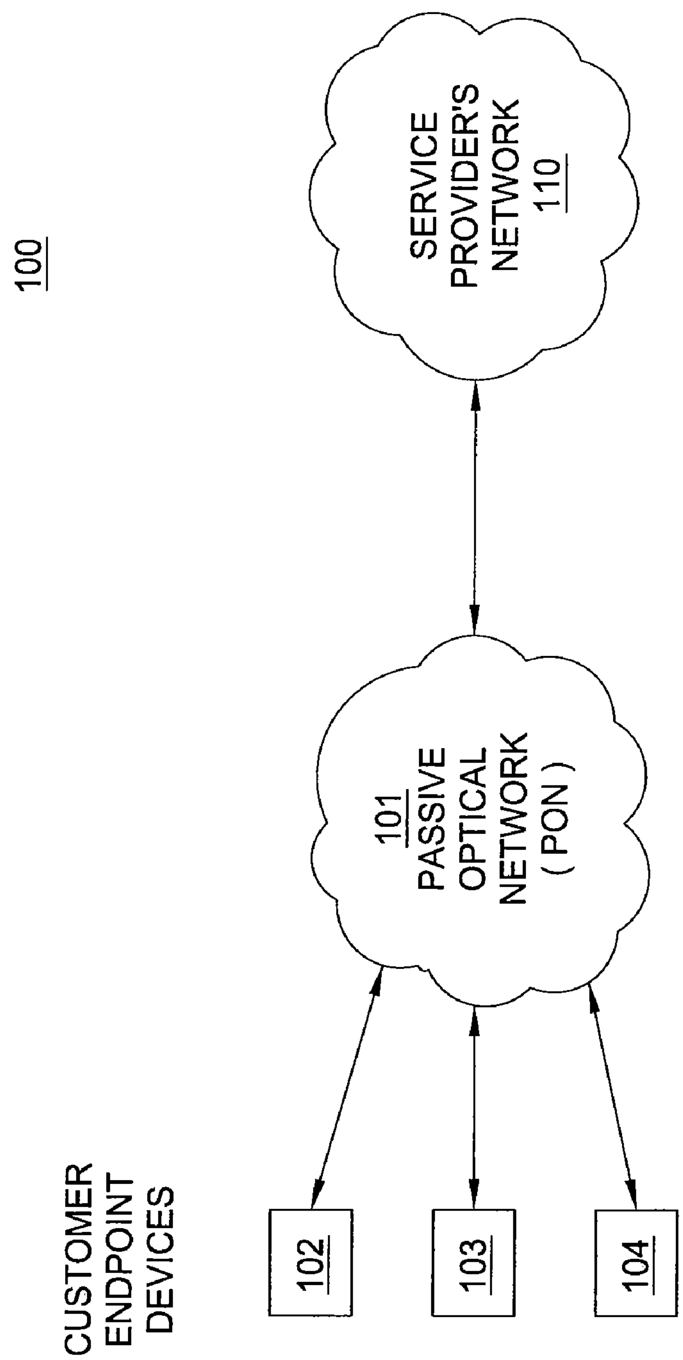
FIG. 1 illustrates an exemplary network of the current invention.

FIG. 1 illustrates an exemplary network 100 of the current invention. Customer endpoint devices 102-104 are connected to the service provider's network 110 through a passive optical network 101 to receive voice and data services. The Passive Optical Network (PON) is used to deliver optical fiber signals to the end user, e.g. fiber-to-the-home systems, fiber-to-the-curb systems, etc.

Figure 2:
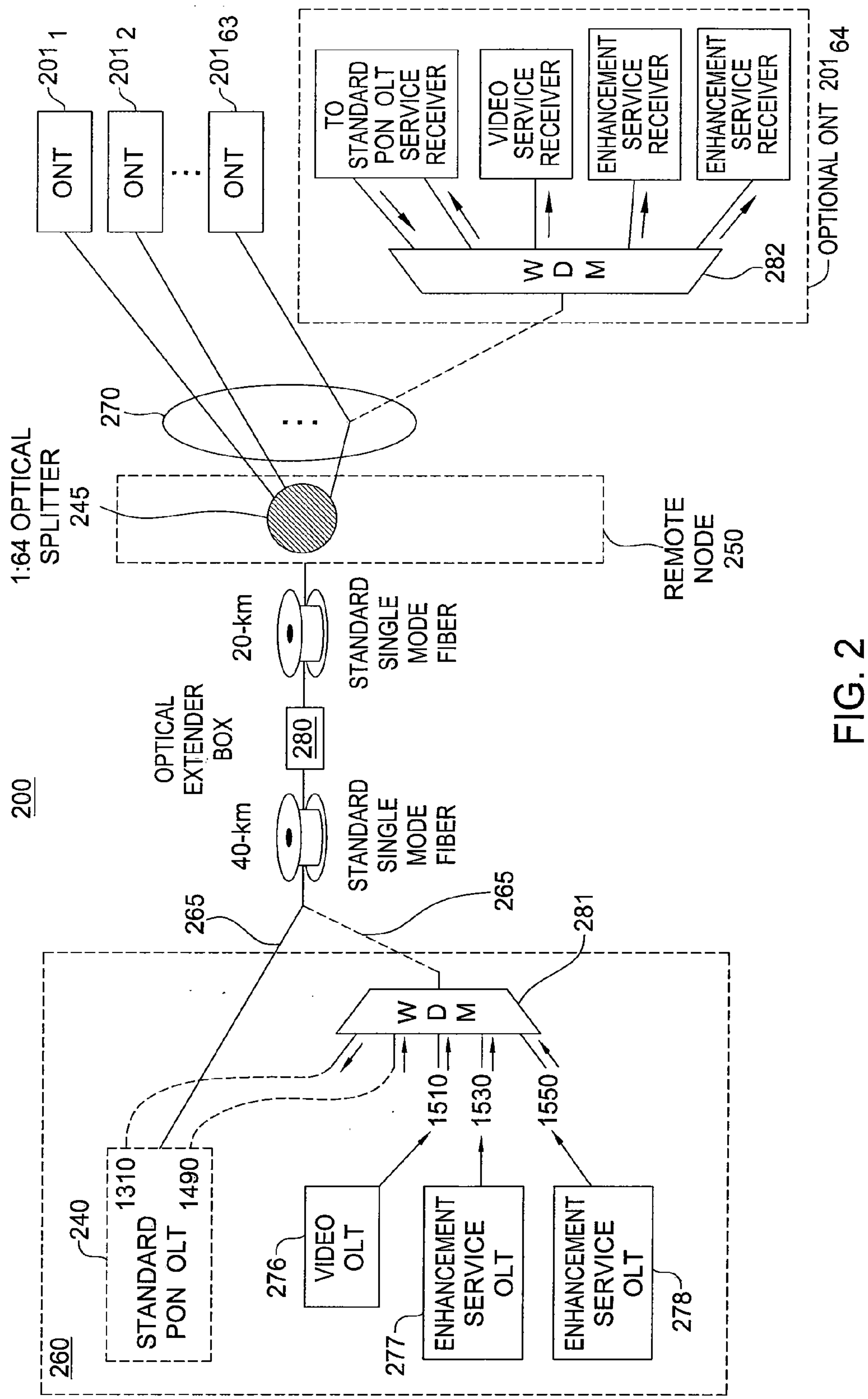
FIG. 2 illustrates an exemplary embodiment of a PON of the current invention.

FIG. 2 illustrates an exemplary embodiment of a PON 200 of the current invention. In describing the interactions of the different components in FIG. 2, those skilled in the art would realize that FIG. 2 may also serve as a flowchart for describing the methodology for increasing the distance between the OLT and the ONTs and/or increasing the splitting ratio such that more ONTs may be serviced by the same splitter.

PON 200 may comprise an Optical Line Termination (OLT) device 240 located at a service provider's site 260 (e.g., at a central office), an optical extender box 280 of the current invention, a passive optical splitter 245 located at a remote node 250 (e.g., located close to the customer end devices), and a number of Optical Network Termination (ONT) devices $\mathbf{201}_1$-$\mathbf{201}_{64}$. In one embodiment, the central office 260 is part of the service provider's network. Depending on the location of the optical fiber termination, the ONTs 201$_1$-201$_{64}$ may be located at the customer site, at the curb, and so on. The location of the ONTs determines whether the system is described as fiber-to-the-curb (FTTC), fiber-to-the-building (FTTB), fiber-to-the-home (FTTH), fiber-to-the-node (FTTN), or in the most general terms, FTTx.

A transceiver located on the OLT 240 is connected to the passive optical splitter 245 via a feeder fiber (e.g., standard single mode fiber) 265 and optical extender 280. The optical extender box 280 may be located in a remote node at an optimal distance for amplifying the optical signals received from the OLT 240. The passive optical splitter 245 is connected to the ONTs 201$_1$-201$_{64}$ via distribution fibers 270. The term "passive" refers to the fact that the device has no power requirements or active electronic parts. In one embodiment, identical optical signals are distributed to all the ONTs. Note that the power of the optical signal received by an ONT is a small fraction of the optical power received by the splitter. In one embodiment, a de-multiplexer is used within each ONT to limit the received optical bandwidth (or wavelength) to the desired signal for each user. Due to the power margins of laser transmitters and photo detectors used in the OLT and ONT transceivers, the maximum reach for a PON without the optical extender 280 of the current invention is often limited. For example, for a PON with a splitting ratio of 1:32 and an optical signal transmission over single mode optical fibers, the distance between the OLT and the farthest ONT is often limited to 20 km. However, the optical extender box 280 of the current invention may amplify the optical signals such that the distance between the OLT and the farthest ONT may be increased to 60 km (e.g., 40 km for a first standard single mode fiber section and 20 km for a second standard single mode fiber section deployed on either side of the optical extender box) and the splitting ratio may be increased, e.g., to 1:64.

In one embodiment, the wavelength plan for TDM traffic on passive optical networks is downstream transmission in the band of 1480-1500 nm wavelengths, and upstream transmission in the band of 1260-1360 nm wavelengths. However, as businesses and services expand delivering "multiple" services on fiber links as close as possible to the customers becomes more and more important.

In one embodiment, the current invention enables the service provider to optionally provide additional services using other wavelengths. Thus, the optical extender box 280 of the current invention may amplify not only the regular TDM signal but also as many as three or four additional Coarse Wavelength Division Multiplexing (CWDM) wavelengths. The additional wavelengths may be used to provide video and data services. For example, depending on economic and technical considerations, the CWDM wavelengths centered at 1510 nm, 1530 nm, and 1550 nm may be used each with a distinct downstream service, or a larger number of a Dense Wave Division Multiplexing (DWDM) wavelengths may be used. Each enhancement wavelength may carry a separate downstream service.

In one embodiment, the WDM combiner 281 located at the central office 260 is used to combine the CWDM signals sourced by a plurality of enhancement OLTs, e.g., video OLT 276, other enhancement service OLTs 277 and 278, with the TDM signals coming from the PON OLT 240. The combined optical signal is then transmitted on feeder fiber 265 towards the optical extender box 280. For customers who subscribe to the enhanced data and video services, their ONT 201$_{64}$ includes a WDM splitter 282 (de-multiplexer) that directs the enhancement wavelengths and the standard PON wavelength signals to one or more distinct optical receivers for detecting the specific services. For example, if a customer subscribed to a video service provided on a particular CWDM wavelength, the optional ONT 201$_{64}$ for said customer includes a de-multiplexer that separates the CWDM wavelength from the signal to be directed to the regular TDM receiver. The WDM splitter 282 directs the enhancement wavelength (the CWDM wavelength being used for video) to a distinct optical receiver that detects the video service.

Figure 3:
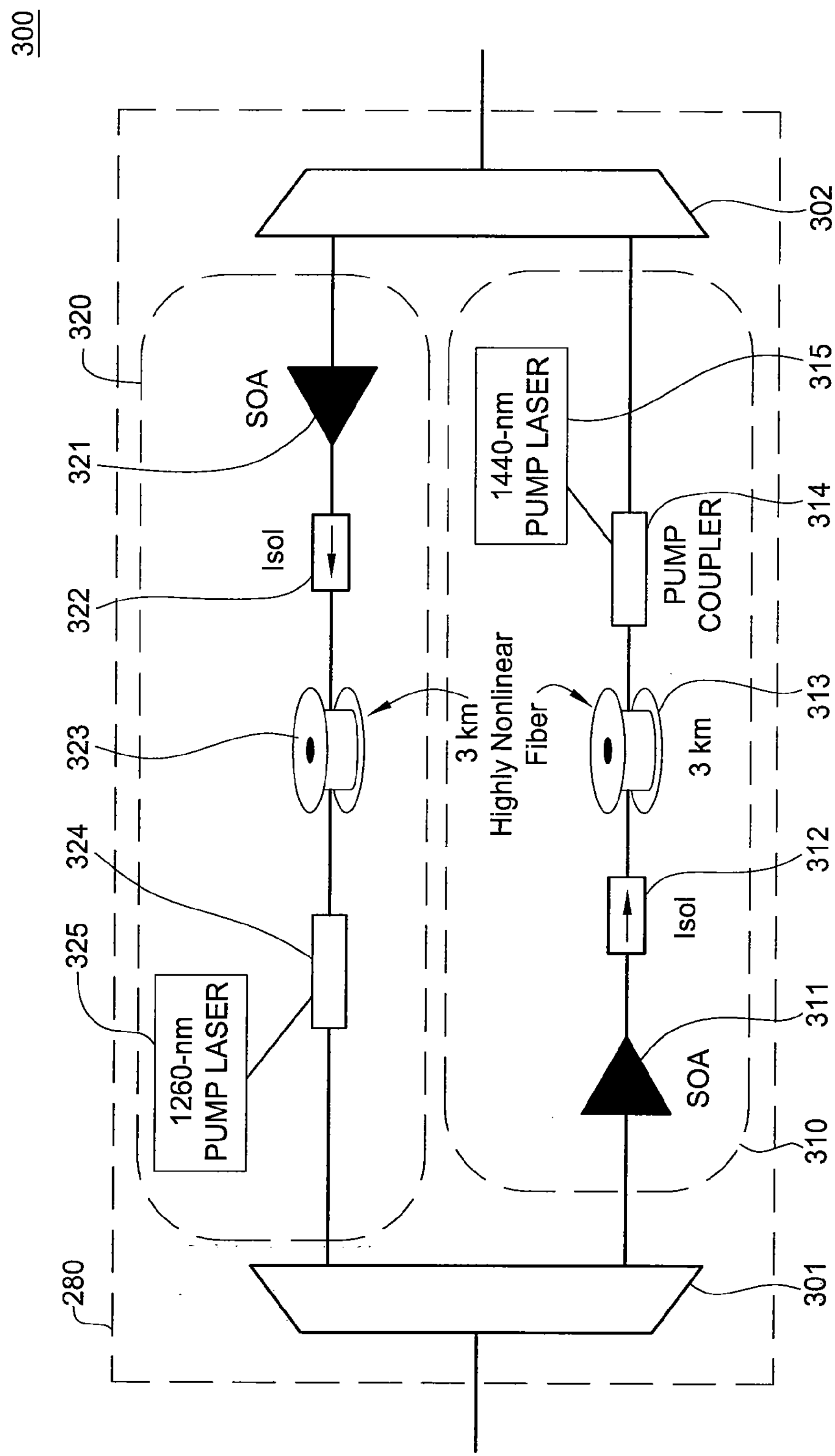
FIG. 3 illustrates the optical extender box of the current invention.

FIG. 3 illustrates the optical extender box 280 of the current invention. The wavelength diplexers 301 and 302 are used to separate and recombine the downstream and upstream wavelengths. The wavelength plan for Time Division Multiplexed (TDM) traffic on passive optical networks is downstream transmission (e.g., towards customer) in the band of 1480-1500 nm wavelengths, and upstream transmission (e.g., towards service provider) in the band of 1260-1360 nm wavelengths. The lower leg or portion 310 contains a hybrid SOA-Raman amplifier for the downstream signals and the upper leg or portion 320 contains a hybrid SOA-Raman amplifier for the upstream signals.

The hybrid SOA-Raman amplifier is a two-stage amplifier comprising a conventional semiconductor optical amplifier (SOA) followed (or preceded depending on the implementation) by a low-powered Raman amplifier stage. The combination of SOA gain and Raman gain results in an amplifier with high and flat gain. For each leg, the high gain is determined by the peak gain of the SOA stage. Note that the gain of the SOA stage decreases monotonically with increasing wavelength. The flatness of the gain is due to the gain of the Raman amplifier stage that comprises a Raman pump laser, a pump coupler, and a non-linear fiber. The gain of the Raman amplifier stage acts to compensate for the monotonic decrease in the gain of the SOA stage. The optical bandwidth of the hybrid SOA-Raman amplifier may exceed 100 nm with a gain flatness of approximately 1 dB or better. Since the amplifier has a total bandwidth exceeding 100 nm, it is capable of amplifying the 1490 band (from 1480 to 1500 nm) and enhancement wavelengths in the range 1500 to 1580 nm. The loss of any additional transmission fiber is assumed to be 0.4 dB/km and the loss associated with each doubling of the splitting ratio is slightly more than 3 dB.

For example, in a system with 10 km of added fiber and a splitting ratio that has been increased by a factor of 4 to 1:128 (doubled twice), the amplifier needs to have a gain of at least 10 dB (4 dB to overcome the fiber loss and 2×3 dB to overcome the additional splitting loss). Similarly, for a system with 40 km of additional fiber and 1:64 split, the gain of the hybrid amplifier needs to be at least 19 dB. A downstream gain of 20 dB is therefore large enough to compensate the maximum loss of 16 dB associated with an additional 40 km of fiber plus an additional 3-dB of splitting loss for increasing the split ratio from 1:32 to 1:64 (1 dB spare). Also, since the Raman gain is only used to compensate the non-flat response of the SOA, only moderate Raman pump powers are required, resulting in a more practical, higher gain, and a more cost effective design than an all-Raman amplifier. Furthermore, since both SOAs and Raman amplifiers can be designed for any band within the low-loss window of optical fibers, hybrid SOA-Raman amplifiers may be designed to meet any wavelength specifications. As such, enhancement wavelengths can be deployed by a service provider. For example, the three enhancement wavelengths (as discussed below) are chosen to coincide with standard CWDM channels at 1510, 1530, and 1550 nm.

Although FIG. 3 illustrates an optical extender 280 having two hybrid SOA-Raman amplifiers 310 and 320, there may be scenarios where only a single hybrid SOA-Raman amplifier is required. For example, in one embodiment, the upstream wavelength (at 1310 nm) is amplified using a conventional SOA stage, e.g., amplifier 320 is replaced with a conventional SOA. For example, the upstream signal may not require the hybrid SOA-Raman amplifier. There may be a small power penalty (~1 dB) due to chromatic dispersion associated with the increased transmission distance and added optical noise from the amplifier subsystem at this wavelength. For example, in one embodiment, an optical filter centered on the 1310-nm upstream channel may be included between the upstream SOA and the OLT receiver to limit the spontaneous noise added by the SOA. Note that, the downstream signals do not require additional optical filtering since the demultiplexer within each ONT limits the optical bandwidth (and hence the noise bandwidth) of each channel.

For the optical extender box 280 illustrated in detail in FIG. 3, the isolators 322 and 312 are used to limit optical signals in the opposite direction to the transmission. For example, for the downstream signals on leg or portion 310, the pump laser 315 may insert optical signal at 1440 nm. The pump coupler 314 then couples the pump signal with the downstream signals. The downstream signals are amplified as both signals propagate in the highly non-linear fiber 313. The isolator 312 blocks the pump wavelength from reaching the SOA 311. For the upstream leg or portion 320, the pump laser 325 inserts optical signal at 1260 nm. The coupler 324 couples the pump signal with the upstream signal. The upstream signal is amplified as both signals propagate through the highly non-linear fiber 323. The isolator 322 prevents the pump signal (1260 nm signal) from reaching the SOA 321.

In the above description, the pump wavelengths for the downstream and upstream signals were 1440 nm and 1260 nm, respectively. However, the wavelength for each pump laser may be chosen at a different nearby wavelength to optimize performance. For example, the upstream SOA 321 may be chosen to have a gain peak near 1280 nm and the downstream SOA 311 may be chosen to have a gain peak near 1460 nm. In addition, the SOA stage is shown as the first stage in FIG. 3. However, those skilled in the art would realize the order of the SOA and discrete Raman stages may be reversed depending on their relative performance.

In one embodiment, the current invention enables two or more PONs to share a common feeder fiber by sharing an extender box. By choosing distinct pairs of CWDM wavelengths for each PON, multiple PONs may share a common feeder fiber. Unique pairs of standard CWDM wavelengths are used to establish downstream and upstream communication for several PONs over a common infrastructure.

Figure 4:
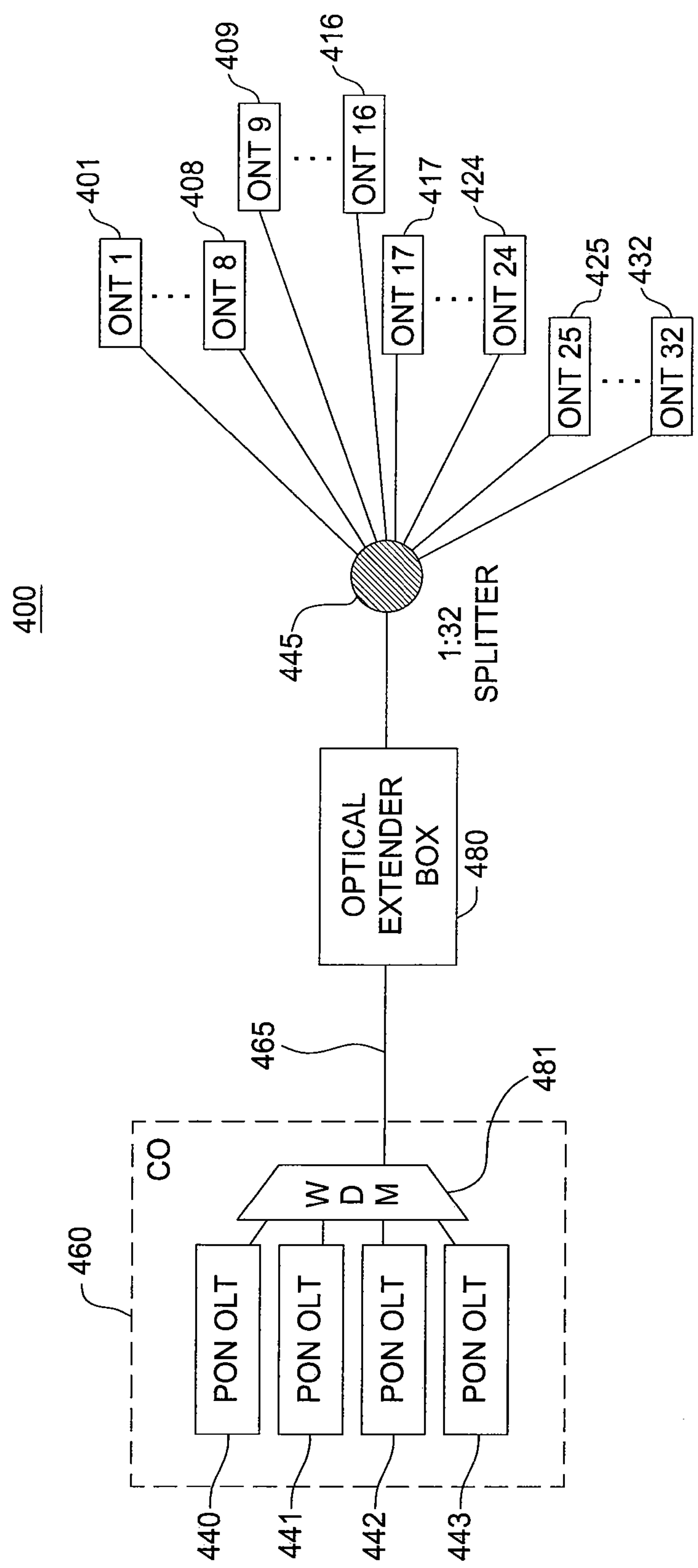
FIG. 4 illustrates an exemplary embodiment with four PONs sharing a common feeder.

In one embodiment, the bandwidth available for each ONT is increased by subdividing a PON and using an extender box. FIG. 4 illustrates an exemplary embodiment 400 with four PONs sharing a common feeder. In describing the interactions of the different components in FIG. 4, those skilled in the art would realize that FIG. 4 may also serve as a flowchart for describing the methodology for increasing the bandwidth available for each ONT by allowing multiple ONTs to share a feeder fiber.

For example, WDM 481 located at the central office 460 may connect a plurality of PON OLTs, e.g., the 4 PON OLTs 440-443 to the feeder fiber 465. The combined signal is transmitted towards the splitter 445 through the optical extender box 480. The ONTs 401-432 may have wavelength filters in order to pass only the wavelength intended for that ONT. Members of a given sub-PON (e.g., a subgroup of ONTs 401-408, ONTs 409-416, ONTs 417-424, or ONTs 425-432) would use the same optical filter to receive down stream information from a specific PON OLT (e.g. 440, 441,442 or 443) and also would transmit on the same upstream CWDM wavelength.

Figure 5:
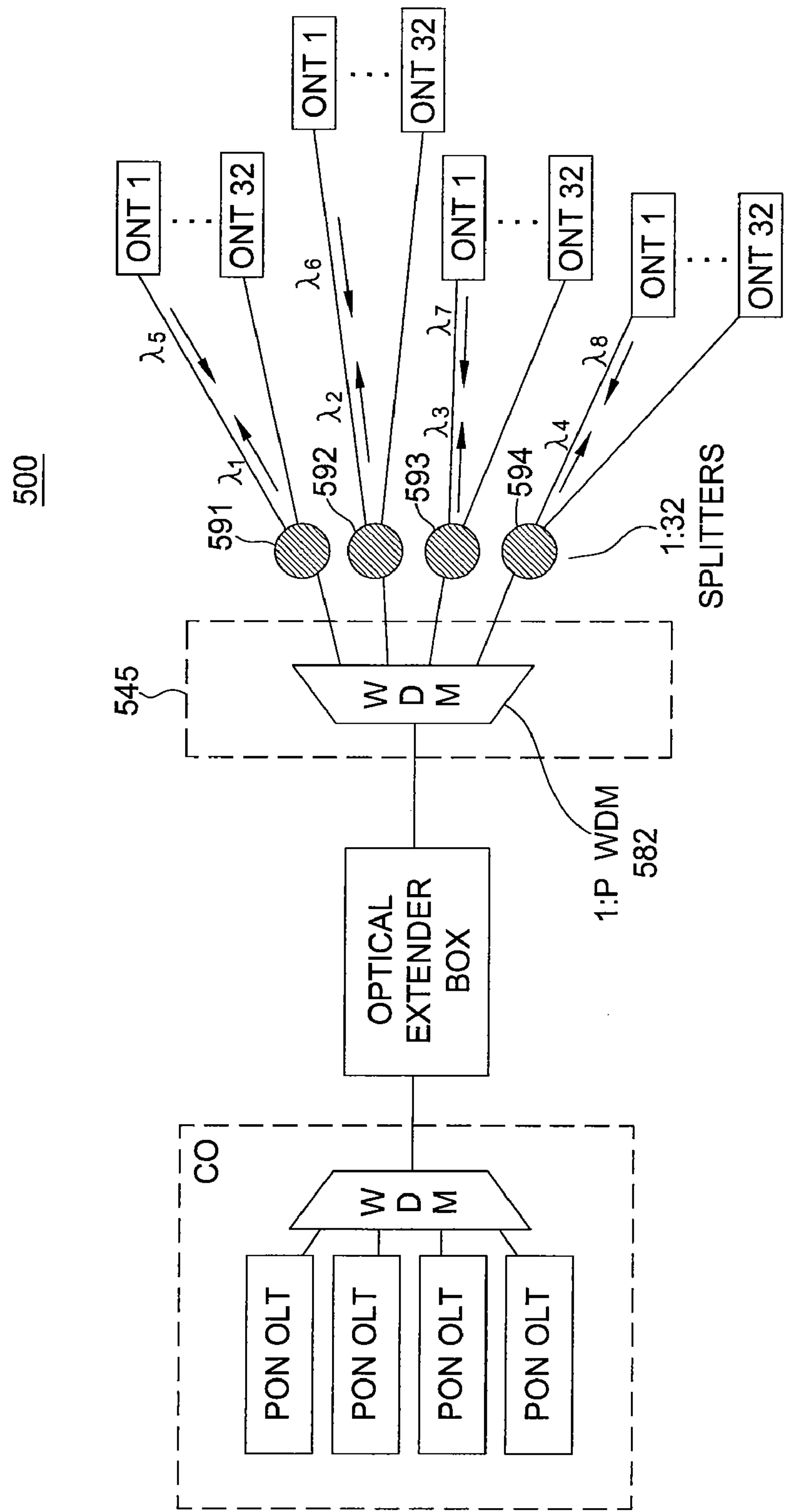
FIG. 5 illustrates an exemplary embodiment for multiplying the number of ONTs served by a feeder fiber.

In another embodiment, the number of ONTs served by each feeder fiber is increased by using an extender box. FIG. 5 illustrates an exemplary embodiment 500 for multiplying the number of ONTs served by a feeder fiber. In describing the interactions of the different components in FIG. 5, those skilled in the art would realize that FIG. 5 may also serve as a flowchart for describing the methodology for increasing the number of ONTs served by each feeder fiber.

For example, a 1:P WDM 582 analogous to the one used at the central office is provided at a remote node 545. The WDM 582 directs the wavelength (in both directions) for each of the P passive optical networks to and from a distinct passive splitter (591, 592, 593 or 594) connected to that PON's distribution fibers serving N ONTs. Each of the passive splitters is shown serving 32 ONTs. Table 1 provides an exemplary wavelength plan for sharing the feeder fiber among 4 PONs. The wavelengths are chosen on the CWDM grid.

TABLE 1

An exemplary wavelength plan for PONs sharing a common feeder fiber.

| | PON 1 | PON 2 | PON 3 | PON 4 |
|---|---|---|---|---|
| Downstream wavelength | Wavelength 1 1470 nm | Wavelength 2 1490 nm | Wavelength 3 1510 nm | Wavelength 4 1530 nm |
| Upstream wavelength | Wavelength 5 1290 nm | Wavelength 6 1310 nm | Wavelength 7 1330 nm | Wavelength 8 1350 nm |

In one embodiment, the current invention enables two or more PONs to share sources for downstream wavelength services by implementing the extender box at the central office. For example, sources for downstream services, e.g. a high definition TV source, may be heavily shared among several PONs to reduce the per subscriber cost. This embodiment permits more economical broadcast service by enabling the cost of the hybrid SOA-Raman amplifier and laser sources to be shared among many users (via multiple PONs).

Figure 6:
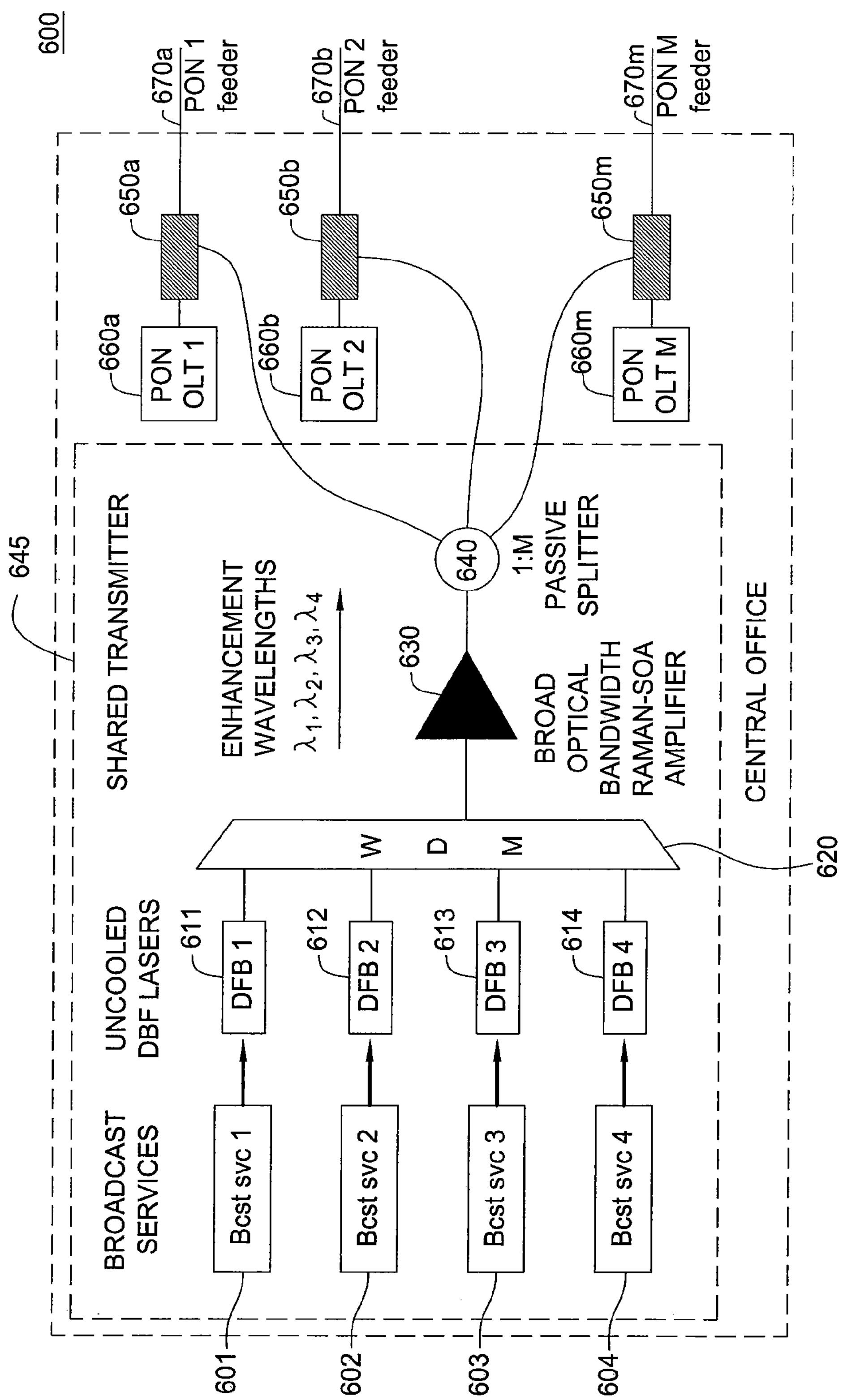
FIG. 6 provides an exemplary network with PONs heavily sharing sources.

FIG. 6 provides an exemplary network 600 with PONs heavily sharing sources. In describing the interactions of the different components in FIG. 6, those skilled in the art would realize that FIG. 6 may also serve as a flowchart for describing the methodology for enabling more than one PON to share a source signal.

For example, each of the four un-cooled CWDM Distributed Feedback (DFB) laser diodes 611-614 (broadly referred to as light sources) is directly modulated with one of the broadcast service sources 601-604 for providing source information. The broadcast services 601-604 may comprise of IP packets transmitted as a base-band signal (e.g. Internet protocol based TV (IPTV)), or may comprise of digital video streams modulated onto radio frequency (RF) carriers, or may comprise of analog video signals modulated onto RF carriers, or some other electrical format. The modulated optical signals from the four lasers 611-614 are combined in a WDM multiplexer 620.

In one embodiment, a power combiner may be used instead of the WDM multiplexer. The output of the multiplexer 620 is then input into a hybrid SOA-Raman amplifier 630 such that the output power is substantially higher than the output power of each of the DFB laser transmitters 611-614. The output of the hybrid SOA-Raman amplifier 630 is input into a passive 1:M splitter 640. Each of the M outputs from the splitter 640 having a split signal is connected to a WDM band multiplexer 650*a*-650*m*. The signal from the PON OLT for each of the M passive optical networks (660*a*-660*m*) is multiplexed with the corresponding signal from one of the M distinct signals coming from the splitter 640 in the appropriate multiplexer. The output of the multiplexer is then fed to a PON via a respective 670*a*-670*m* feeder. For example, the signal from the PON OLT 660*a* is multiplexed with the corresponding signal coming from the splitter 640 in multiplexer 650*a*. The output of the multiplexer 650*a* is fed to a PON via feeder 670*a*. Each of the PONs being fed via 670*a*-670*m* may each be PONs of the current invention illustrated in FIG. 2.

Thus, for a hybrid amplifier with output power of +20 dBm per channel, the splitting ratio following the amplifier might be 1:32 (typically corresponding to ≦17 dB splitting loss) and the excess loss of the WDM band mux may be 1 dB or less, resulting in +2 dBm launched into the feeder fiber (which is comparable to the expected launch power per channel in a standard PON). For the example as shown in FIG. 6, the components 601-604, 611-614, 620, 630 and 640 may comprise a shared transmitter 645 and may serve 32×32=1024 users. It has been observed that using the shared transmitter 645 will significantly lower the cost per PON when compared to conventional transmitters.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An optical network, comprising:

a plurality of enhancement service sources, where each of said plurality of enhancement service sources provides source information;

a plurality of light sources, coupled to said plurality of enhancement service sources, where each of said light sources is for modulating said source information from one of said plurality of enhancement service sources to form a modulated optical signal;

a wave division multiplexer (WDM) combiner, coupled to said plurality of light sources, for combining said modulated optical signals received from said plurality of light sources;

at least two hybrid SOA-Raman amplifiers, wherein a first of said at least two hybrid SOA-Raman amplifiers amplifies said modulated optical signals in a first wavelength band, wherein a second of said at least two hybrid SOA-Raman amplifiers amplifies said modulated optical signals in a second wavelength band, wherein said first wavelength band is different from said second wavelength band, wherein said at least two hybrid SOA-Raman amplifiers are coupled to said WDM combiner, wherein each of said at least two hybrid SOA-Raman amplifiers is a two-stage amplifier that comprises a semiconductor optical amplifier (SOA) stage and a Raman amplifier stage, wherein the Raman amplifier stage compensates for a monotonic decrease in a gain of the SOA stage; and at least one optical splitter, coupled to said at least two hybrid SOA-Raman amplifiers, wherein said at least one optical splitter comprises a plurality of outputs.

2. The optical network of claim 1, wherein said plurality of enhancement service sources, said plurality of light sources, said wave division multiplexer (WDM) combiner, said at least two hybrid SOA-Raman amplifiers and said at least one optical splitter are deployed as a shared transmitter.

3. The optical network of claim 1, further comprising:

a plurality of WDM band multiplexers, where each of said plurality of WDM band multiplexers is coupled to one of said plurality of outputs of said at least one optical splitter.

4. The optical network of claim 3, further comprising:

a plurality of optical line termination (OLT) devices, where each OLT device having a transceiver for sending and receiving optical signals; and wherein each of said plurality of WDM band multiplexers multiplexes a split signal from one of said plurality of outputs of said at least one optical splitter with an optical signal from one of said plurality of optical line termination (OLT) devices.

5. The optical network of claim 1, wherein said at least one optical splitter is a passive optical splitter.

6. The optical network of claim 4, wherein said at least one optical splitter has a splitting ratio of 1:M, where M correlates with said plurality of optical line termination (OLT) devices.

7. The optical network of claim 4, wherein each of said plurality of optical line termination (OLT) devices is associated with a separate Passive Optical Network (PON).

8. The optical network of claim 4, wherein each of said plurality of optical line termination (OLT) devices having a downstream transmission band of 1470 nm-1530 nm.

9. The optical network of claim 1, wherein said source information comprises at least one of: Internet Protocol (IP) packets transmitted as a base-band signal, a digital video signal modulated on a radio frequency (RF) carrier, or an analog video signal modulated on a radio frequency (RF) carrier.

10. An optical network, comprising:

a plurality of enhancement service source means, where each of said plurality of enhancement service source means provides source information;

a plurality of light source means, coupled to said plurality of enhancement service source means, where each of said light source means is for modulating said source information from one of said plurality of enhancement service source means to form a modulated optical signal;

a wave division multiplexer (WDM) combining means, coupled to said plurality of light source means, for combining said modulated optical signals received from said plurality of light source means;

at least two hybrid SOA-Raman amplifying means, wherein a first of said at least two hybrid SOA-Raman amplifying means amplifies said modulated optical signals in a first wavelength band, wherein a second of said at least two hybrid SOA-Raman amplifying means amplifies said modulated optical signals in a second wavelength band, wherein said first wavelength band is different from said second wavelength band, wherein said at least two hybrid SOA-Raman amplifying means are coupled to said WDM combining means, wherein each of said at least two hybrid SOA-Raman amplifying means is a two-stage amplifier means that comprises a semiconductor optical amplifier (SOA) stage and a Raman amplifier stage, wherein the Raman amplifier stage compensates for a monotonic decrease in a gain of the SOA stage; and at least one optical splitting means, coupled to said at least two hybrid SOA-Raman amplifying means, wherein said at least one optical splitting means comprises a plurality of outputs.

11. The optical network of claim 10, wherein said plurality of enhancement service source means, said plurality of light source means, said wave division multiplexer (WDM) combining means, said at least two hybrid SOA-Raman amplifying means and said at least one optical splitting means are deployed as a shared transmitter.

12. The optical network of claim 10, further comprising:

a plurality of WDM band multiplexing means, where each of said plurality of WDM band multiplexing means is coupled to one of said plurality of outputs of said at least one optical splitting means.

13. The optical network of claim 12, further comprising:

a plurality of optical line terminating (OLT) means, where each OLT means having a transceiver for sending and receiving optical signals; and wherein each of said plurality of WDM band multiplexing means multiplexes a split signal from one of said plurality of outputs of said at least one optical splitting means with an optical signal from one of said plurality of optical line terminating (OLT) means.

14. The optical network of claim 10, wherein said at least one optical splitting means is a passive optical splitter.

15. The optical network of claim 13, wherein said at least one optical splitting means has a splitting ratio of 1:M, where M correlates with said plurality of optical line terminating (OLT) means.

16. The optical network of claim 13, wherein each of said plurality of optical line termination (OLT) means is associated with a separate Passive Optical Network (PON).

17. The optical network of claim 13, wherein each of said plurality of optical line terminating (OLT) means having a downstream transmission band of 1470 nm-1530 nm.

18. The optical network of claim 10, wherein said enhancement service source information comprises at least one of: Internet Protocol (IP) packets transmitted as a base-band signal, a digital video signal modulated on a radio frequency (RF) carrier, or an analog video signal modulated on a radio frequency (RF) carrier.

19. A method for providing an optical network, comprising:

providing a plurality of enhancement service sources, where each of said plurality of enhancement service sources provides source information;

providing a plurality of light sources, coupled to said plurality of enhancement service sources, where each of said light sources is for modulating said source information from one of said plurality of enhancement service sources to form a modulated optical signal;

providing a wave division multiplexer (WDM) combiner, coupled to said plurality of light sources, for combining said modulated optical signals received from said plurality of light sources;

providing at least two hybrid SOA-Raman amplifiers, wherein a first of said at least two hybrid SOA-Raman amplifiers amplifies said modulated optical signals in a first wavelength band, wherein a second of said at least two hybrid SOA-Raman amplifiers amplifies said modulated optical signals in a second wavelength band, wherein said first wavelength band is different from said second wavelength band, wherein said at least two hybrid SOA-Raman amplifiers are coupled to said WDM combiner, wherein each of said at least two hybrid SOA-Raman amplifiers is a two-stage amplifier that comprises a semiconductor optical amplifier (SOA) stage and a Raman amplifier stage, wherein the Raman amplifier stage compensates for a monotonic decrease in a gain of the SOA stage; and providing at least one optical splitter, coupled to said at least two hybrid SOA-Raman amplifiers, wherein said at least one optical splitter comprises a plurality of outputs.

20. The method of claim 19, further comprising:

providing a plurality of WDM band multiplexers, where each of said plurality of WDM band multiplexers is coupled to one of said plurality of outputs of said at least one optical splitter.

* * * * *